(12) United States Patent
Al-Shafei et al.

(10) Patent No.: US 10,350,515 B2
(45) Date of Patent: *Jul. 16, 2019

(54) DYNAMIC DEMULSIFICATION SYSTEM FOR USE IN A GAS-OIL SEPARATION PLANT

(71) Applicant: Saudi Arabian Oil Company, Dhahran (SA)

(72) Inventors: Emad Naji Al-Shafei, Dhahran (SA); M. Rashid Khan, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 251 days.

This patent is subject to a terminal disclaimer.

(21) Appl. No.: 15/419,632

(22) Filed: Jan. 30, 2017

(65) Prior Publication Data
US 2017/0136388 A1 May 18, 2017

Related U.S. Application Data

(63) Continuation of application No. 13/495,599, filed on Jun. 13, 2012, now Pat. No. 9,555,345.
(Continued)

(51) Int. Cl.
*B01D 17/04* (2006.01)
*B01D 17/06* (2006.01)
(Continued)

(52) U.S. Cl.
CPC .............. *B01D 17/12* (2013.01); *B01D 17/04* (2013.01); *B01D 17/042* (2013.01); *B01D 17/06* (2013.01);
(Continued)

(58) Field of Classification Search
CPC ...... B01D 17/04; B01D 17/042; B01D 17/06; B01D 17/12; B01D 2201/54;
(Continued)

(56) References Cited

U.S. PATENT DOCUMENTS 4,582,629 A 4/1986 Wolf
4,853,119 A 8/1989 Wolf et al.
(Continued)

FOREIGN PATENT DOCUMENTS

CN 1252486 A 5/2005
CN 101020185 A 8/2007
(Continued)

OTHER PUBLICATIONS

Papavinasam, Sakara, Corrosion in the Oil and Gas Industry, Oct. 2013.
(Continued)

*Primary Examiner* — Lucas A Stelling
(74) *Attorney, Agent, or Firm* — Abelman, Frayne & Schwab

(57) ABSTRACT

A dynamic demulsification system to facilitate the removal of water from oil for use in a gas-oil separation plant (GOSP) which has a dehydrator vessel in fluid communication with a desalter vessel which in turn is in fluid communication with a water/oil separator vessel includes the following system components:
  an in-line microwave treatment subsystem upstream of one or two of each of the dehydrator vessel, the desalter vessel and the water/oil separator vessel, each of which vessels receives a water-oil emulsion;
  a sensor for the real-time monitoring and transmission of data representing one or more properties of the water-oil emulsion in the respective vessel(s) and/or downstream of the respective vessel(s) with which the sensor is associated; and
  a processor/controller that receives the data from the sensor and transmits one or more signals to the one or both of the respective in-line microwave treatment subsystem(s) to generate and apply microwave energy
(Continued)

of predetermined characteristics to the flowing fluid based on the properties of the emulsion.

12 Claims, 6 Drawing Sheets

Related U.S. Application Data

(60) Provisional application No. 61/511,650, filed on Jul. 26, 2011.

(51) Int. Cl.
*B01D 17/12* (2006.01)
*C10G 31/08* (2006.01)
*C10G 33/02* (2006.01)
*C10G 33/08* (2006.01)

(52) U.S. Cl.
CPC ............. *C10G 31/08* (2013.01); *C10G 33/02* (2013.01); *C10G 33/08* (2013.01); *B01D 2201/54* (2013.01); *B01D 2221/04* (2013.01)

(58) Field of Classification Search
CPC .... B01D 2221/04; C10G 31/08; C10G 33/02; C10G 33/08
See application file for complete search history.

(56) References Cited

U.S. PATENT DOCUMENTS

| | | |
|---|---|---|
| 4,853,507 A | 8/1989 | Samardzija |
| 5,055,180 A | 10/1991 | Klaila |
| 5,911,885 A | 6/1999 | Owens |
| 6,077,400 A | 6/2000 | Kartchner |
| 6,086,830 A | 7/2000 | Kartchner |
| 6,440,312 B1 | 8/2002 | Kasevich |
| 6,555,009 B2 | 4/2003 | Varadaraj |
| 6,716,358 B2 | 4/2004 | Varadaraj |
| 7,150,836 B2 | 12/2006 | Meikrantz |
| 7,162,057 B1 | 1/2007 | Roth et al. |
| 7,629,497 B2 | 12/2009 | Pringle |
| 7,705,058 B2 | 4/2010 | Coutinho et al. |
| 7,828,057 B2 | 11/2010 | Kearl et al. |
| 2006/0180500 A1 | 8/2006 | Gunnerman |
| 2007/0017876 A1 | 1/2007 | Albinson et al. |
| 2008/0221226 A1* | 9/2008 | Coutinho ............... B01D 17/04 516/194 |
| 2011/0120913 A1 | 5/2011 | Snawerdt |

FOREIGN PATENT DOCUMENTS

| | | |
|---|---|---|
| EP | 1977806 A2 | 10/2008 |
| WO | 2008107673 A1 | 9/2008 |

OTHER PUBLICATIONS

Christensen, "Installation and Testing of a Jorin Visual Process Analyzer", 2010.
Ge, "Leakwise ID-223 Oil Sheen Sensor", 2005.
International Search Report and Written Opinion dated Nov. 7, 2012 in International Application PCT/US2012/042229 (11 pages).
International Preliminary Report on Patentability dated Jan. 28, 2014 in International Application PCT/US2012/042229 (6 pages).

* cited by examiner

DYNAMIC DEMULSIFICATION SYSTEM FOR USE IN A GAS-OIL SEPARATION PLANT

RELATED APPLICATIONS

This application is a continuation application of U.S. patent application Ser. No. 13/495,599 filed on Jun. 13, 2012, which claims the benefit of U.S. Provisional Patent Application No. 61/511,650 filed Jul. 26, 2011, the disclosures of which are hereby incorporated by reference.

BACKGROUND OF THE INVENTION

Field of the Invention

This invention relates to improvements in whole crude oil processing, and in particular to an improved method for the demulsification of whole crude oil in a gas-oil separation plant.

Description of Related Art

Crude oil typically contains varying quantities of gas, water and solids based on various well known factors. Water injection processes, in which water is injected into the reservoir to increase pressure and stimulate production, particularly in mature oil fields, increases the water cut, or percentage of water in the produced crude oil. Oil can be present in water as free-oil, an emulsion, and/or dissolved states of varying proportions. "Free-oil" commonly refers to oil droplets of 150 microns or larger which will float immediately to the surface due to their large size and relatively rapid rise velocity. An emulsion is a stable dispersion of oil in water and is formed due to the relatively small diameters of the oil droplets.

Gas oil separation plants (GOSPs) are well known and are used to separate gas, water and oil in order to produce dry crude oil as the end product. Higher water cuts and tight emulsions of wet oil from reservoirs increase the difficulty of, and requisite time for the separation in the GOSP. As the water cut increases, the retention time within the separation equipment is increased to cope with the excess water, and, as a result, the rate of oil production is reduced and the GOSP becomes a bottleneck in the oil production.

Oil droplet size distribution is an important factor impacting the design of oil-water separators. Costs associated with treating, handling and disposing of this water increases over time, as separation efficiency is low. The settling velocity ($V_t$), which measures coarse separation of oil and water, depends on the magnitude of the difference in densities of the two immiscible liquids. The settling velocity function according to Stoke's law is:

$$V_t = \frac{gD^2(d_o - d_w)}{18\mu}$$

where,
g=gravitational acceleration (m/sec$^2$);
D=diameter of a globule (m);
$d_w$=density of water (kg/m$^3$);
$d_o$=density of a globule (kg/m$^3$); and
µ=absolute viscosity (kg/m·sec).

The same relationship governs the rising of light liquid droplets in a heavier liquids, in which $V_t$ is a negative value.

Small oil droplets are more difficult to separate. According to Stoke's law, decreased droplet size results in lower rising velocities. A prerequisite for efficient separation is, therefore, that oil droplets coalesce, i.e., become larger and rise more rapidly.

Water discharge regulations have become more stringent, and compliance in an economical and efficacious manner presents an ongoing challenge to the industry. While several widely accepted techniques exist for removing oil from water, there are limitations, including the oil removal efficiency, i.e., final oil concentration in the treated water, and the oil droplet size for which a selected technique is optimized. Often two to three types of oil-water separation technologies are employed to treat the produced water to the desired lower hydrocarbon concentrations. In a mature oilfield, e.g., one producing oil having a water cut of greater than 30%, the economics of the well change significantly. Accordingly, design characteristics of a free-water knockout (FWKO) should be changed or else the FWKO becomes a bottleneck due to the excess water in the influent crude.

GOSPs are typically designed and constructed to handle oil production from one or more wells situated in one or more reservoirs, the crude oil sources being pooled for processing. The main objective of a GOSP is to increase the flowability and to produce dry crude oil as an end product, e.g., for loading into tankers or for passage through pipelines to the refineries.

In general, a GOSP is a continuous separation process that commonly includes a two-stage or three-stage oil-gas separation facility. Unit operations include a dehydrator unit, a desalting unit, a water/oil separation vessel (WOSEP), a stabilizer column, a high pressure production trap (HPPT) and a low pressure production trap (LPPT). In addition, the GOSP can include boilers, condensers, separation pumps, heat exchangers, mixing valves for addition of demulsification chemicals, skimmers for stabilizing the emulsion, recycle pumps, level valves, relay valves, and control system components such as one or more sensors operatively coupled to a computerized controller or an operator notification system.

Referring to the schematic diagram of FIG. 1, a typical single train GOSP system 10 of the prior art includes an HPPT unit 31, a LPPT unit 41, a wet crude oil holding tank 49, a dehydrator unit 51, a desalter unit 61, a water/oil separator vessel 71, a wastewater vessel 72, a stabilizer column 81, a reboiler 82 and a dry crude oil vessel 91.

A wet crude oil or a tight emulsion crude oil stream 30 from a well pool enters the HPPT unit 31 where crude oil is separated into a gas discharge stream 32, a water discharge stream 33 that is discharged for collection to the water/oil separator vessel 71, and a wet crude oil stream 34. Wet crude oil stream 34 from the HPPT unit 31 is passed to the LPPT unit 41 where the contents are separated into a gas discharge stream 42, a water discharge stream 43 which is discharged for collection to the water/oil separator vessel 71, and a wet crude oil stream 44 which is passed to a wet crude oil holding tank 49.

Wet crude oil stream 48 is pumped from wet crude oil holding tank 49 and is conveyed to a dehydrator unit 51 for further water/oil separation. A water stream 53 is discharged for collection in water/oil separator vessel 71, and a crude oil stream 52 is conveyed to a desalter unit 61. Wet crude oil is washed in desalter unit 61 with aquifer water (not shown), the treated wet crude oil stream 62 is passed to a stabilizer column 81, and a water stream 63 is discharged for collection in water/oil separator vessel 71.

The stabilizer column 81 has a number of trays (e.g., up to sixteen), whereby crude oil flows down over each tray until it reaches a draw-off tray. A reboiler 82 heats dry crude oil from the draw-off tray and returns it to the stabilizer column 81. Light components in the crude oil vaporize and rise through the stabilizer trays. Hydrogen sulfide and light hydrocarbons are removed as a gas stream 84, and a dry crude oil stream 92 is discharged and collected in a dry crude oil vessel 91.

Water/oil separator vessel 71 collects water from streams 33, 43, 53 and 63, and separates oil from the collected water using, e.g., centrifugal pumps. Wastewater is discharged to a wastewater vessel 72 and extracted oil is conveyed to the wet crude oil holding tank 49.

In general, the HPPT unit 31 operates at a pressure of from about 100 pounds-force per square inch gauge (PSIG) to about 200 PSIG and a temperature of from about 50° C. to about 80° C. LPPT unit 41 operates at a pressure of from about 30 PSIG to about 70 PSIG and a temperature of from about 35° C. to about 80° C.

A GOSP is generally designed to treat water cuts in the range of about 30% to about 40% by gravimetric separation. The ultimate goal of a GOSP is to reduce the content of contaminant to a suitable level, e.g., less than 0.2% bottoms, sediment and water (BS&W), and lower concentration of dissolved hydrogen sulfide in order to meet crude oil specifications.

Tight emulsions of oil in water (or water in oil) occur naturally, during transportation of crude oil from the wells to the GOSP, and within the GOSP. The emulsion level in wet crude increases due to agitation and mixing, particularly when production from the wells is enhanced by injected water. In addition, excess water increases the load in the dehydration and desalting units, the time for gravimetric separation, and the requisite quantity of chemical additives.

Tight emulsions can be formed by mechanical mixing and/or chemical action. Chemically-created emulsions are generally due to addition of stabilizers in the reservoir formation. Mechanically-created emulsions are caused by pumping, large pressure drops through chokes, control valves, and other mixing operations. These mechanical forces also impact droplet size. For example, passing fluids through choke valves (from high pressure regions to lower pressure regions) may cause a reduction in droplet size. The mechanical shearing forces can create a high proportion of dispersed oil droplets of 10 µm and less.

Tight emulsions become increasingly difficult to remove, especially when they contain about 1%-4% water in the crude oil. For very tight emulsions, dehydration and desalter units require additional chemicals and an increase in recycling/pumping to remove the water from the emulsions. However, incorporation of chemical additives can be inefficient due to the low retention time and inefficient mixing.

Accordingly, the long-standing problem addressed by the present invention is how to improve whole crude oil processing to increase the crude oil flowability in a GOSP, and in particular, to improve the demulsification of whole crude oil in a GOSP.

SUMMARY OF THE INVENTION

In accordance with embodiments of the present invention, one or more in-line microwave treatment subsystems are incorporated in a GOSP to break tight oil-water emulsions at such positions as upstream of the dehydrator vessel, upstream of the desalter vessel, upstream of the water/oil separation vessel, both upstream of the dehydrator vessel and upstream of the desalter vessel, both upstream of the dehydrator vessel and upstream of the water/oil separation vessel, both upstream of the desalter vessel and upstream of the water/oil separation vessel, or upstream of each of the dehydrator vessel, the desalter vessel and the water/oil separation vessel. The operation of each subsystem or combination is subject to a dynamic monitoring and control system by which characteristics of the emitted electromagnetic energy from the in-line microwave treatment subsystem(s) are varied according to information signals transmitted to a control computer via one or more in-line data acquisition elements, e.g., sensors and other instruments known in the art.

For convenience, the term "sensor" will be used to refer to any various devices that are used to measure and/or characterize the properties of the crude oil stream processed in the GOSP.

In accordance with one embodiment, a dynamic demulsification system for use in a GOSP includes the following:

an in-line microwave treatment subsystem upstream of a dehydrator vessel for receiving a water-oil emulsion;

a sensor for the real-time monitoring and transmission of data representing one or more properties of the water-oil emulsion in the dehydrator vessel or downstream of the dehydrator vessel and upstream of a desalter vessel; and a processor/controller that receives the data from the sensor and transmits one or more signals to the in-line microwave treatment subsystem to generate and apply microwave energy of predetermined characteristics to the flowing fluid based on the properties of the emulsion.

In accordance with another embodiment, a dynamic demulsification system for use in a GOSP includes the following:

an in-line microwave treatment subsystem upstream of a desalter vessel for receiving a water-oil emulsion;

a sensor for the real-time monitoring and transmission of data representing one or more properties of the water-oil emulsion in the desalter vessel or downstream of the desalter vessel and upstream of a water/oil separator vessel; and a processor/controller that receives the data from the sensor and transmits one or more signals to the in-line microwave treatment subsystem to generate and apply microwave energy of predetermined characteristics to the flowing fluid based on the properties of the emulsion.

In accordance with another embodiment, a dynamic demulsification system for use in a GOSP includes the following:

an in-line microwave treatment subsystem upstream of a water/oil separator vessel for receiving a water-oil emulsion;

a sensor for the real-time monitoring and transmission of data representing one or more properties of the water-oil emulsion in the water/oil separator vessel or downstream of the water/oil separator vessel; and a processor/controller that receives the data from the sensor and transmits one or more signals to the in-line microwave treatment subsystem to generate and apply microwave energy of predetermined characteristics to the flowing fluid based on the properties of the emulsion.

In accordance with another embodiment, a dynamic demulsification system for use in a GOSP includes the following:

a first in-line microwave treatment subsystem upstream of a dehydrator vessel for receiving a water-oil emulsion;

a first sensor for the real-time monitoring and transmission of data representing one or more properties of the water-oil emulsion in the dehydrator vessel or downstream of the dehydrator vessel and upstream of a desalter vessel;

a second in-line microwave treatment subsystem upstream of the desalter vessel for receiving a water-oil emulsion;

a second sensor for the real-time monitoring and transmission of data representing one or more properties of the water-oil emulsion in the desalter vessel or downstream of the desalter vessel and upstream of a water/oil separator vessel; and a processor/controller that receives the data from the first sensor and transmits one or more signals to the first in-line microwave treatment subsystem to generate and apply microwave energy of predetermined characteristics to the flowing fluid based on the properties of the emulsion as determined by the first sensor, and receives the data from the second sensor and transmits one or more signals to the second in-line microwave treatment subsystem to generate and apply microwave energy of predetermined characteristics to the flowing fluid based on the properties of the emulsion as determined by the second sensor.

In accordance with another embodiment, a dynamic demulsification system for use in a GOSP includes the following:

a first in-line microwave treatment subsystem upstream of a dehydrator vessel for receiving a water-oil emulsion;

a first sensor for the real-time monitoring and transmission of data representing one or more properties of the water-oil emulsion in the dehydrator vessel or downstream of the dehydrator vessel and upstream of a desalter vessel;

a second in-line microwave treatment subsystem upstream of a water/oil separator vessel for receiving a water-oil emulsion;

a second sensor for the real-time monitoring and transmission of data representing one or more properties of the water-oil emulsion in the water/oil separator vessel or downstream of the water/oil separator vessel; and a processor/controller that receives the data from the first sensor and transmits one or more signals to the first in-line microwave treatment subsystem to generate and apply microwave energy of predetermined characteristics to the flowing fluid based on the properties of the emulsion as determined by the first sensor, and receives the data from the second sensor and transmits one or more signals to the second in-line microwave treatment subsystem to generate and apply microwave energy of predetermined characteristics to the flowing fluid based on the properties of the emulsion as determined by the second sensor.

In accordance with another embodiment, a dynamic demulsification system for use in a GOSP includes the following:

a first in-line microwave treatment subsystem upstream of a desalter vessel for receiving a water-oil emulsion;

a first sensor for the real-time monitoring and transmission of data representing one or more properties of the water-oil emulsion in the desalter vessel or downstream of the desalter vessel and upstream of a water/oil separator vessel;

a second in-line microwave treatment subsystem upstream of the water/oil separator vessel for receiving a water-oil emulsion;

a second sensor for the real-time monitoring and transmission of data representing one or more properties of the water-oil emulsion in the water/oil separator vessel or downstream of the water/oil separator vessel; and a processor/controller that receives the data from the first sensor and transmits one or more signals to the first in-line microwave treatment subsystem to generate and apply microwave energy of predetermined characteristics to the flowing fluid based on the properties of the emulsion as determined by the first sensor, and receives the data from the second sensor and transmits one or more signals to the second in-line microwave treatment subsystem to generate and apply microwave energy of predetermined characteristics to the flowing fluid based on the properties of the emulsion as determined by the second sensor.

In accordance with another embodiment, a dynamic demulsification system for use in a GOSP includes the following:

a first in-line microwave treatment subsystem upstream of a dehydrator vessel for receiving a water-oil emulsion;

a first sensor for the real-time monitoring and transmission of data representing one or more properties of the water-oil emulsion in the dehydrator vessel or downstream of the dehydrator vessel and upstream of a desalter vessel;

a second in-line microwave treatment subsystem upstream of the desalter vessel for receiving a water-oil emulsion;

a second sensor for the real-time monitoring and transmission of data representing one or more properties of the water-oil emulsion in the desalter vessel or downstream of the desalter vessel and upstream of a water/oil separator vessel;

a third in-line microwave treatment subsystem upstream of the water/oil separator vessel for receiving a water-oil emulsion;

a third sensor for the real-time monitoring and transmission of data representing one or more properties of the water-oil emulsion in the water/oil separator vessel or downstream of the water/oil separator vessel; and a processor/controller that receives the data from the first sensor and transmits one or more signals to the first in-line microwave treatment subsystem to generate and apply microwave energy of predetermined characteristics to the flowing fluid based on the properties of the emulsion as determined by the first sensor, receives the data from the second sensor and transmits one or more signals to the second in-line microwave treatment subsystem to generate and apply microwave energy of predetermined characteristics to the flowing fluid based on the properties of the emulsion as determined by the second sensor, and receives the data from the third sensor and transmits one or more signals to the third in-line microwave treatment subsystem to generate and apply microwave energy of predetermined characteristics to the flowing fluid based on the properties of the emulsion as determined by the third sensor.

Still other aspects, embodiments, and advantages of these exemplary aspects and embodiments are discussed in detail below. Moreover, it is to be understood that both the foregoing description and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments. The drawings, together with the remainder of the specification, serve to explain principles and operations of the described and claimed aspects and embodiments.

BRIEF DESCRIPTION OF THE DRAWINGS

The foregoing summary as well as the following detailed description will be best understood when read in conjunction with the attached drawings. For the purpose of illustrating the invention, there are shown in the drawings embodiments which are presently preferred. It should be understood, however, that the invention is not limited to the precise arrangements and apparatus shown. In the drawings, the same numeral is used to refer to the same or similar elements, in which.

DETAILED DESCRIPTION OF THE INVENTION

A dynamic demulsification system for the improvement of whole crude oil processing in a GOSP includes an improved demulsification method in which in-line microwave treatment subsystems are integrated in the GOSP after the treatment stage of the high pressure trap (HPPT) and the low pressure production trap (LPPT) in the demulsification system. Microwave energy promotes inter-particle contact and produces larger droplets that are easier to separate from. Microwave treatment also makes the removal of hydrogen sulfide dissolved in wet crude oil easier by increasing the degassing of the soluble hydrogen sulfide. In addition, several in-situ sensors are incorporated in the system to improve process efficiency, safety and to provide signals for the control of the electromagnetic energy applied to the fluid stream.

Figure 2:
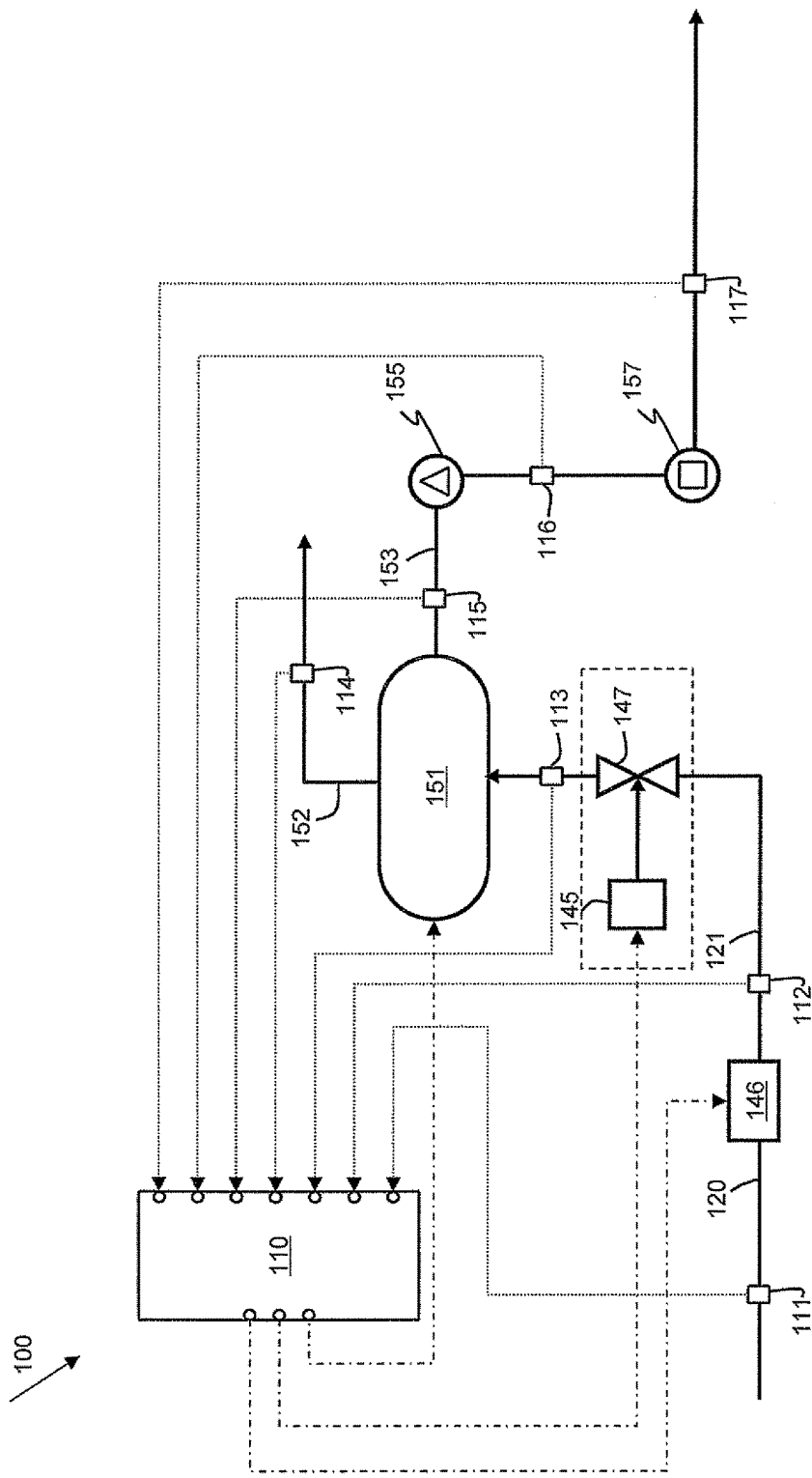
FIG. 2 is a schematic diagram of a portion of one embodiment of an improved whole crude oil demulsification system.
Figure 3:
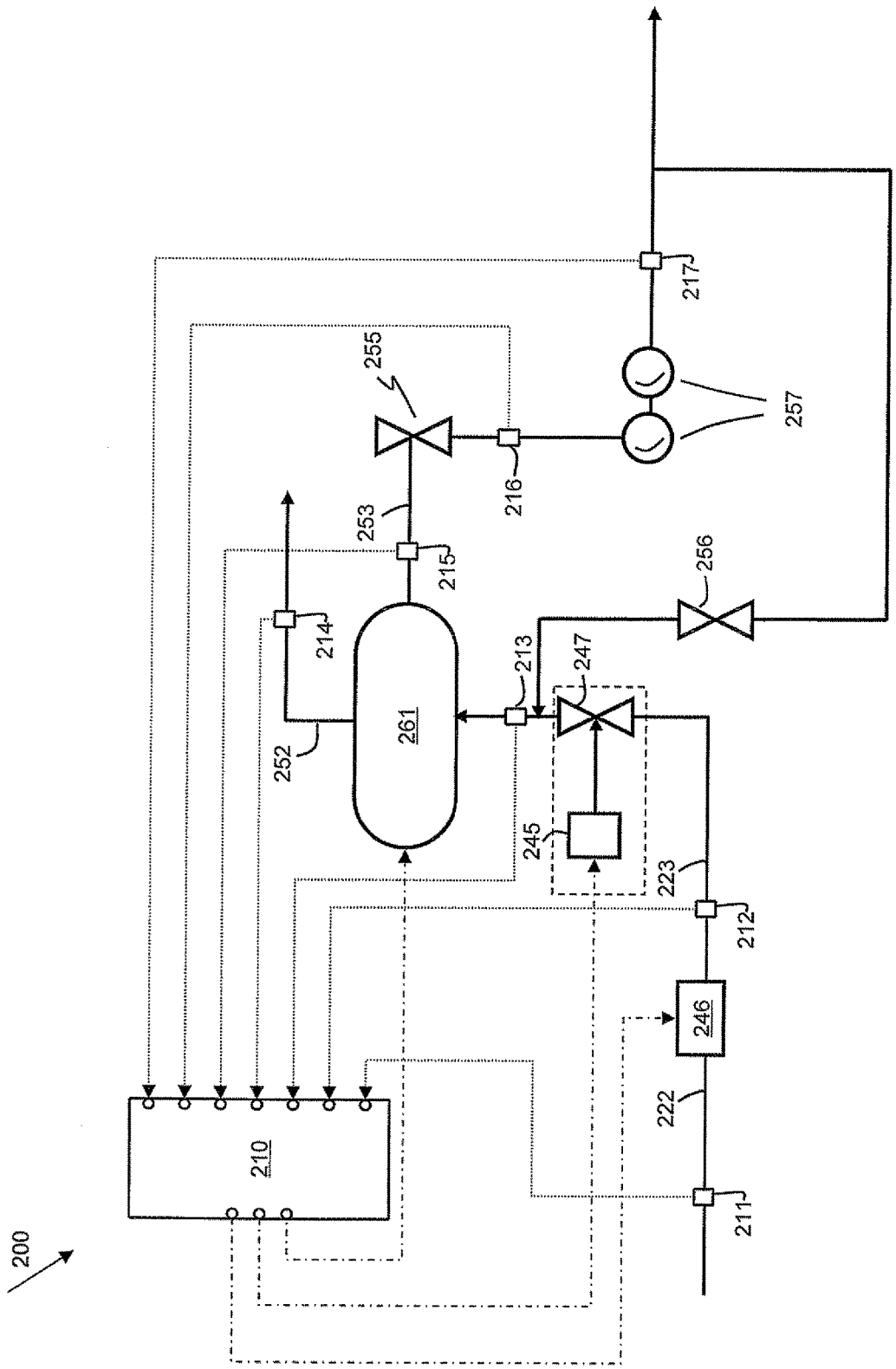
FIG. 3 is a schematic diagram of a portion of another embodiment of an improved whole crude oil demulsification system.
Figure 4:
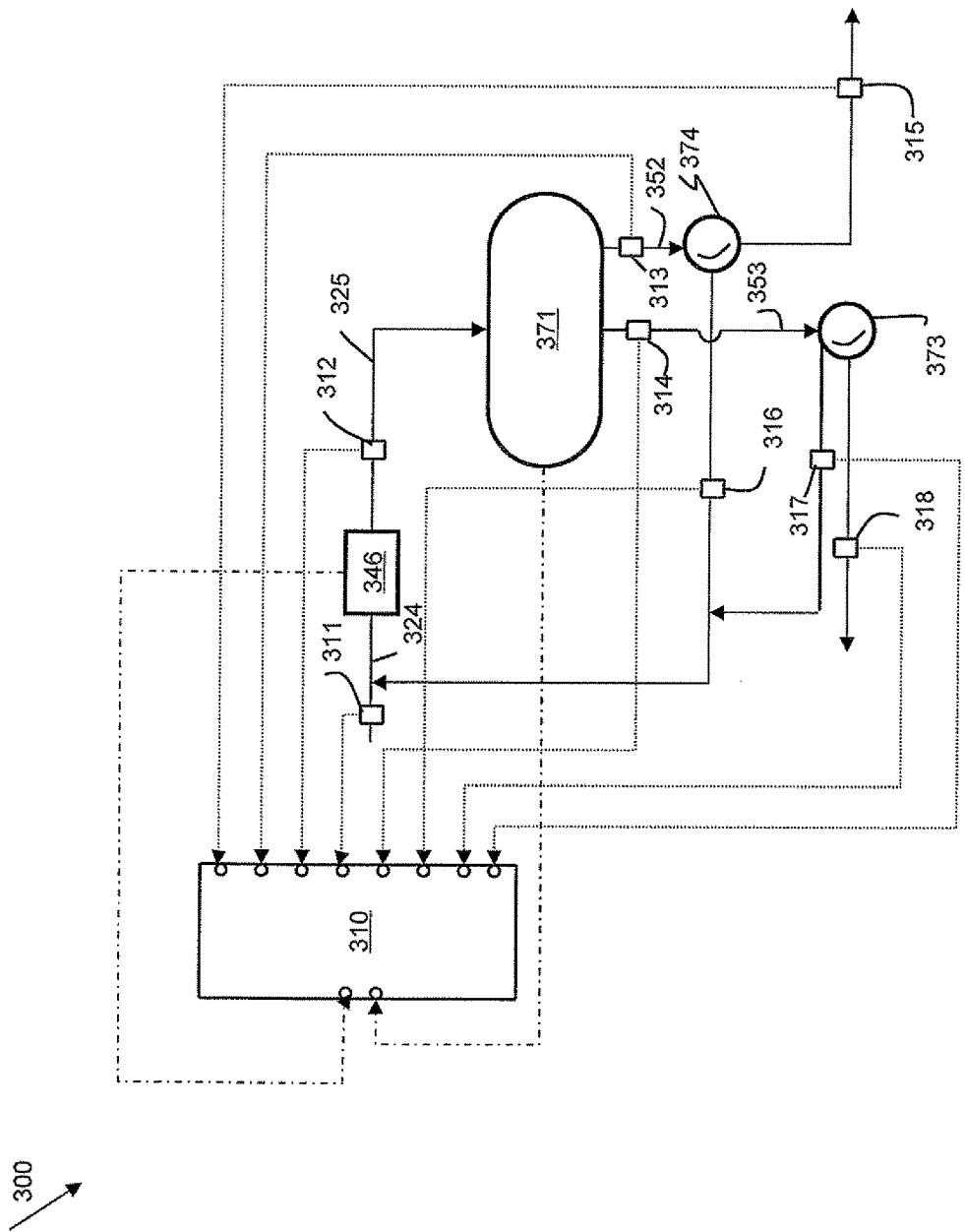
FIG. 4 is a schematic diagram of a portion of a further embodiment of an improved whole crude oil demulsification system.

FIGS. 2-4 are schematic diagrams of portions of a GOSP incorporating embodiments of the dynamic demulsification system of the inventions emphasizing in-line microwave treatment subsystems at one or more locations in the GOSP to break tight oil-water emulsions. Electromagnetic energy is applied to the wet crude oil in order to break the emulsion and separate water from oil that is conveyed into one or more of the dehydrator vessel, desalter vessel, or water/oil separation vessel. Electromagnetic energy from the microwave source is applied directly to the wet crude oil, and as a result, increases the temperature causing reduction in viscosity and hence an increase in settling velocity according to Stoke's law. In addition, the electromagnetic energy causes alteration of the interaction between the oil droplets and the water droplets in favor of coagulation of the oil into larger droplets, thereby further increasing the settling velocity according to Stoke's law.

In the various arrangements, the power characteristics of the applied energy are dynamically adjusted based on data related to the requisite degree of demulsification for the wet crude oil at one or more of the locations identified in FIGS. 2-4. These characteristics include, but are not limited to, hard emulsion properties, water-cut, and flow rate. The electromagnetic energy interacts with water molecules to heat the stream of wet crude oil to a temperature in the range of from about 100° C. to 120° C. for about 1 minute to about 15 minutes to thereby enhance separation of water from the crude oil.

In addition to treating tight emulsions, application of electromagnetic energy also serves to reduce the quantity of dissolved $H_2S$ present in the crude oil. The $H_2S$ concentration can be measured by an $H_2S$ sensor positioned upstream of the stabilizer column. The final product, i.e., dry crude oil, contains less than 10 ppm $H_2S$ in certain embodiments.

Referring to the schematic diagram of FIG. 2, one embodiment of a portion 100 of an improved whole crude oil desulfurization system includes an automated control system 110, an injection apparatus 145, an in-line microwave subsystem 146, a mixing valve 147, a dehydrator vessel 151, a water level and relay valve 155, and a water/oil separator valve 157.

Figure 1:
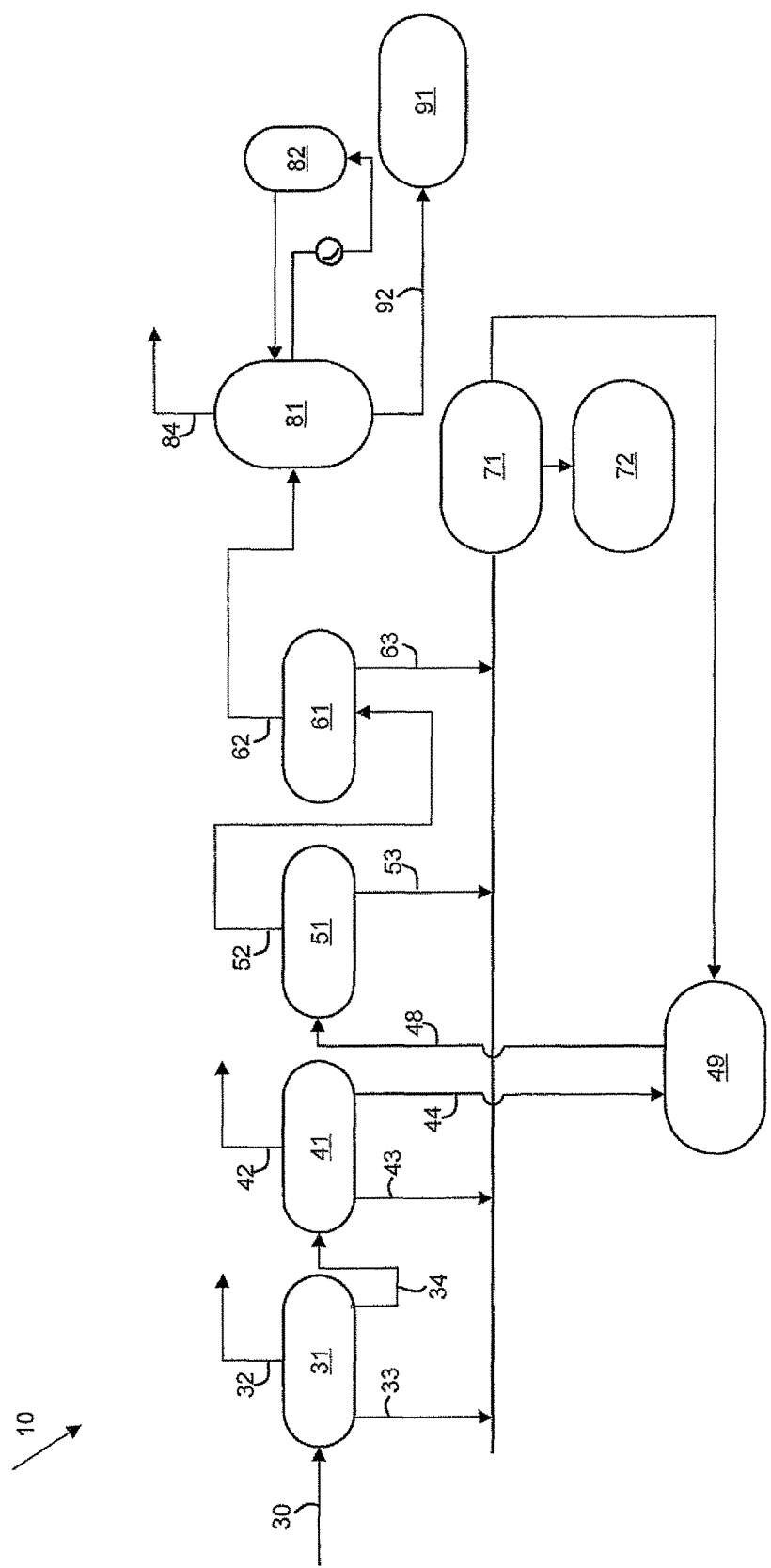
FIG. 1 is a schematic diagram of a typical single train GOSP of the prior art.

The in-line microwave subsystem 146 is positioned upstream of the dehydrator vessel 151 for continuous and/or dynamic flow treatment of wet oil, e.g., wet oil stream 120 from a holding tank. The in-line microwave subsystem 146 can be a single unit or multiple units to treat stream 120 and permit passage of a microwave-treated wet crude oil stream 121 to the dehydrator vessel 151, optionally through a mixing valve 147 for optional incorporation of chemical additives via an injection apparatus 145 such as that indicated in dashed lines in FIG. 1. A wet oil stream 152 is discharged from dehydrator vessel 151 and conveyed to a desalter vessel (not shown). The downstream desalter vessel and associated apparatus can be a conventional subsystem, or in certain embodiments can be desalter unit 261 shown and described with respect to FIG. 3, in which the wet oil passes through another microwave treatment system. A water stream 153 is discharged through a water level and relay valve 155 and a water/oil separator valve 157 to a water/oil separator vessel (not shown). Valves 155 and/or 157 can be used to control the residence time in the dehydrator vessel 151, which time can be controlled by automated control system 110 based on signals corresponding to the characteristics of the treated stream received from sensors.

Figure 5:
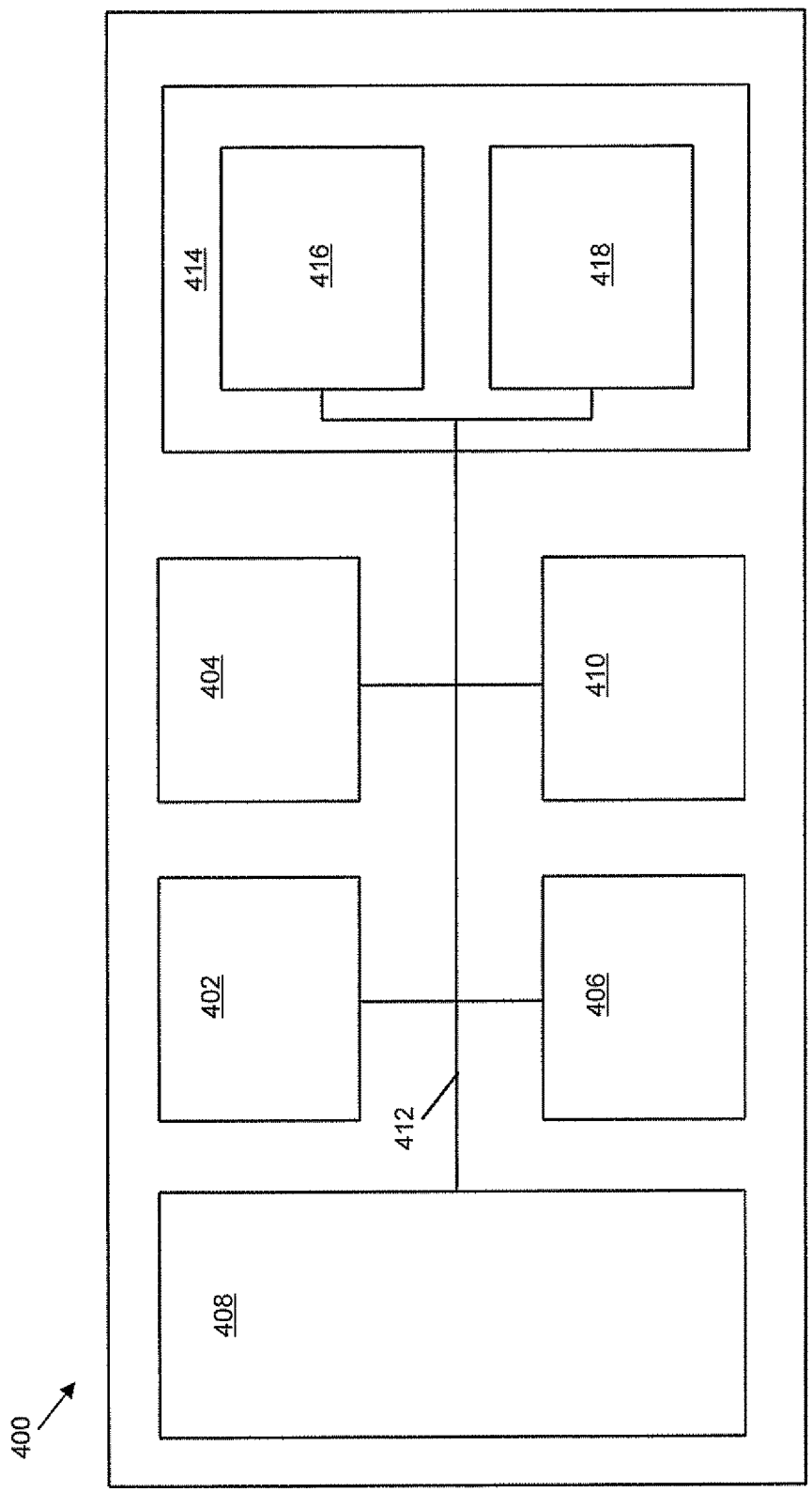
FIG. 5 is an exemplary block diagram of a computer system suitable for use in the practice of the invention.

Sensors can be included at various locations throughout the portion of the GOSP shown in FIG. 2, including one or more of a sensor 111 upstream of the in-line microwave subsystem 146; a sensor 112 downstream of in-line microwave subsystem 146; a sensor 113 downstream of the mixing valve 147; a sensor 114 in wet oil stream 152 discharged from dehydrator vessel 151; a sensor 115 in water stream 153 discharged from dehydrator vessel 151 and upstream of the water level and relay valve 155; a sensor 116 downstream of the water level and relay valve 155 and upstream of water/oil separator valve 157; and a sensor 117 downstream of water/oil separator valve 157. The sensors are in communication with the automated control system 110 to implement appropriate process modifications, thereby providing a dynamic demulsification system. In one embodiment, controller 110 can be any suitable programmed or dedicated computer system, programmable logic controller (PLC), or distributed control system, an example of which is shown in FIG. 5. In embodiments in which additional microwave treatment subsystems are provided at the desalter unit and/or the water/oil separation unit, e.g., as shown in FIGS. 3 and/or 4, a controller performing the functions of controller 110 can be common to those other units, or separate and in communication with the other controllers to provide the appropriate feedback and/or feedforward action(s).

The emulsion properties of the mixture, in the case of one or more of sensors 111, 112, 113 and 114, or the oil-in-water content, in the case of one or more of sensors 115, 116 or 117, are communicated to the controller 110. The data is collected by automated programs, such as a distributed control system, and feedback and/or feedforward action is undertaken to adjust the characteristics of the electromagnetic energy emitted from in-line microwave subsystem 146. In addition, feedback and/or feedforward action can be undertaken regarding the type and/or quantity of chemical additive optionally introduced via injection apparatus 145, or one or more of the operating conditions of the wet oil in dehydrator vessel 151, e.g., temperature, pressure, residence time. The temperature and pressure of dehydrator vessel 151 are controlled by an appropriately programmed microprocessor/controller data control system in response to signals corresponding to those parameters. Dehydrator vessel 151 is also stream jacketed. The temperature of the influent can be varied by an in-line heat exchanger.

Referring to the schematic diagram of FIG. 3, another embodiment of a portion 200 of an improved whole crude oil demulsification system includes an automated control system 210, an injection apparatus 245, an in-line microwave subsystem 246, a first mixing valve 247, a desalter unit 261, a relay valve 255, a second mixing valve 256, and a set of centrifugal pumps 257.

The in-line microwave subsystem 246 is positioned upstream of the desalter unit 261 for continuous and/or dynamic flow treatment of wet oil, e.g., wet oil stream 222 from the dehydrator vessel (not shown). The upstream dehydrator vessel and associated apparatus can be a conventional subsystem, or in certain embodiments can be dehydrator unit 151 shown and described with respect to FIG. 2. The in-line microwave subsystem 246 can be a single unit or multiple units to treat stream 222 and permit passage of a microwave-treated wet crude oil stream 223, optionally through the first mixing valve 247 for optional incorporation of chemical additives via injection apparatus 245, as indicated by dashed lines in FIG. 2. A wet oil stream 252 is discharged and conveyed to a stabilizer column (not shown), and a water stream 253 is discharged through the relay valve 255 and set of centrifugal pumps 257 to a water/oil separator vessel (not shown). The downstream water/oil separator vessel and associated apparatus can be a conventional subsystem, or in certain embodiments can be water/oil separator vessel 371 shown and described with respect to FIG. 4, in which the wet oil passes through another microwave treatment system. Water stream 253 also can be recycled back to the in-line microwave subsystem 246 to further separate water and oil.

Sensors can be included at various locations throughout the portion of the GOSP shown in FIG. 3, including one or more of a sensor 211 upstream of the in-line microwave subsystem 246; a sensor 212 downstream of in-line microwave subsystem 246; a sensor 213 downstream of the first mixing valve 247; a sensor 214 in wet oil stream 252 discharged from desalter unit 261; a sensor 215 in water stream 253 discharged from desalter unit 261 and upstream of the relay valve 255; a sensor 216 downstream of the relay valve 255 and upstream of set of centrifugal pumps 257; and a sensor 217 downstream of the set of centrifugal pumps 257. The sensors are in communication with the automated control system 210 to implement appropriate process modifications thereby providing a dynamic demulsification system. In one embodiment, controller 210 can be any suitable programmed or dedicated computer system, PLC, or distributed control system, an example of which is shown in FIG. 5. In embodiments in which additional microwave treatment subsystems are provided at the dehydrator unit and/or the water/oil separation unit, e.g., as shown in FIGS. 2 and/or 4, a controller performing the functions of controller 210 can be common to those other units, or separate and in communication with the other controllers to provide the appropriate feedback and/or feedforward action(s).

The emulsion properties of the mixture, in the case of one or more of sensors 211, 212, 213 and 214, or the oil-in-water content, in the case of one or more of sensors 215, 216 or 217, are communicated to the controller 210. The data is collected by automated programs, such as distributed control system, and feedback and/or feedforward action is undertaken to adjust the characteristics of the electromagnetic energy emitted from in-line microwave subsystem 246. In addition, feedback and/or feedforward action can be undertaken regarding the type and/or quantity of chemical additive introduced via injection apparatus 245, or one or more of the operating conditions of the wet oil in desalter unit 261 (e.g., temperature, pressure, residence time). Temperature and pressure of desalter unit 261 are controlled by data control system. Desalter unit 261 can be a steam jacketed vessel to implement temperature control. The temperature of the influent is varied by an in-line heat exchanger.

Referring to FIG. 4, a schematic diagram of another embodiment of a portion 300 of an improved whole crude oil demulsification system is provided. The portion 300 includes an automated control system 310, an in-line microwave subsystem 346, a water/oil separator vessel 371, and two centrifugal pumps 373 and 374.

The in-line microwave subsystem 346 is positioned upstream of the water/oil separator vessel 371 for continuous and/or dynamic flow treatment of wet oil, e.g., wet oil stream 324 from the desalter vessel (not shown). The upstream desalter vessel and associated apparatus can be a conventional subsystem, or in certain embodiments can be desalter unit 261 shown and described with respect to FIG. 3. The in-line microwave subsystem 346 can be a single unit or multiple units to treat stream 324 and convey a microwave-treated wet crude oil stream 325 to the water/oil separator vessel 371. A wet oil stream 352 is discharged through the centrifugal pump 374 and conveyed to a wet crude oil holding tank (not shown), and a water stream 353 is discharged through centrifugal pump 373 to a wastewater vessel (not shown). Water stream 353 also can be recycled back to the in-line microwave subsystem 346 to further separate water and oil.

Sensors can be included at various locations throughout the portion of the GOSP shown in FIG. 4, including one or more of a sensor 311 upstream of the in-line microwave subsystem 346; a sensor 312 downstream of in-line microwave subsystem 346; a sensor 313 in wet oil stream 352 discharged from water/oil separator vessel 371 and upstream of the centrifugal pump 374; a sensor 314 in water stream 353 discharged from water/oil separator vessel 371 and upstream of the centrifugal pump 373; a sensor 315 downstream of the centrifugal pump 374 and upstream of the wet crude oil holding tank (not shown); a sensor 316 downstream of the centrifugal pump 374 and upstream of the in-line microwave subsystem 346; a sensor 317 downstream of the centrifugal pump 373 and upstream of the in-line microwave subsystem 346; and a sensor 318 downstream of the centrifugal pump 373 and upstream of the wastewater vessel (not shown). The sensors are in communication with the automated control system 310 to implement an appropriate process modification thereby providing a dynamic demulsification system. In one embodiment, controller 310 can be any suitable programmed or dedicated computer system, PLC, or distributed control system, an example of which is shown in FIG. 5. In embodiments in which additional upstream microwave treatment subsystems are provided at the dehydrator unit and/or the desalter unit, e.g., as shown with respect to FIGS. 2 and/or 3, a controller performing the functions of controller 310 can be common to those other units, or separate and in communication with the other controllers to provide the appropriate feedback and/or feedforward action(s).

The emulsion properties of the mixture, in the case of one or more of sensors 311, 312, 313, 315 and 316, or the oil-in-water content, in the case of one or more of sensors 314, 317 or 318, are communicated to the controller 310. The data is collected by automated programs, such as distributed control system, and feedback and/or feedforward action is undertaken to adjust the characteristics of the electromagnetic energy emitted from in-line microwave subsystem 346. In addition, feedback and/or feedforward action can be undertaken regarding one or more of the operating conditions of the wet oil in water/oil separator vessel 371 (e.g., temperature, pressure, residence time). Temperature and pressure of water/oil separator vessel 371 are controlled by data control system. Water/oil separator vessel 371 can be a steam jacketed vessel to implement temperature control. The temperature of the influent is varied by an in-line heat exchanger.

The dynamic demulsification system described herein can be implemented separately or in cooperation with a real-time optimization system. Such optimization can be further enhanced by the use of microwave energy. Sensors related to temperature and pressure are known in existing Distributed Control Systems (DCS). Various optimization models can be used. For example, a general real-time optimization (RTO) system can be used in typical plants. The RTO can include the following components:

a. Data validation: the input and output data are validated using data reconciliation and signal processing techniques, b. Model updating: the processing facility models, well/network models, are updated to best fit the input and output data available.

c. Model-based optimization: an optimization problem based on the updated models is set up and solved to obtain the optimal control settings.

d. Optimizer command conditioning: a post optimization analysis is performed to check the validity of the computed control settings.

Real-time optimization as conventionally known is a process of measuring or calculating control cycles at a given frequency to maintain the system's optimal operating conditions within the time-constant constraints of the system. Integration or cooperative use of the dynamic demulsification system described herein further enhances the real-time optimization.

By continuously collecting and analyzing plant data, optimal control settings are established. These settings are then either implemented directly in the plant under direction of the DCS or other controller, or they are provided to operating personnel. If settings are implemented directly, the RTO is known as a closed loop system. To achieve optimum or near-optimum operations, a model of the plant is continuously updated by plant measurements to better fit the actual input-output behavior of the processing facilities Suitable software is used to improve throughput and control of continuous processes that have incipient disturbances can be used to optimize the GOSP unit. The software package offers automatic control over continuous processes that are difficult to control by conventional automation techniques. In RTO systems, the optimum values of the set points are re-calculated on a regular basis, e.g., every hour or daily on as-needed basis. These repetitive calculations involve solving a constrained, steady-state optimization problem. Necessary information includes: (a) steady-state process model; (b) economic information (e.g., prices, costs); and (c) a performance index to be maximized (e.g., profit) or minimized (e.g., cost). Note that, the items (b) and (c) are sometimes referred to as an economic model to maximize oil separation from water.

The input signals include water/oil content in the feedstream and overall feed stream, at a minimum, while the output stream will include the optimized oil separation at a minimum energy applied.

The oil/water content determines whether the emulsion is "tight" despite the initial pre-heating. Once it is determined that the emulsion has a high oil content, it can be further processed by microwave treatment.

An exemplary block diagram of a computer system 400 suitable for use with the dynamic demulsification system of the invention system 400 and shown in FIG. 5, can be integrated with or separate from an existing real-time optimization system of the type conventionally used in GOSPs, and includes a processor 402, such as a central processing unit, an input/output interface 404 and support circuitry 406. In certain embodiments, where the computer 400 requires a direct human interface, a display 408 and an input device 410 such as a keyboard, mouse or pointer are also provided. The display 408, input device 410, processor 402, and support circuitry 404 are shown connected to a bus 412 which also connects to a memory 414. Memory 414 includes program storage memory 416 and data storage memory 418. Routines and subroutines for implementing the feedback and/or feedforward controls can be stored in program storage memory 416; data used by those routines and subroutines can be stored in data storage memory 418. Note that while computer 400 is depicted with direct human interface components display 408 and input device 410, programming of modules and exportation of data can alternatively be accomplished over the interface 404, for instance, where the computer 400 is connected to a network and the programming and display operations occur on another associated computer, or via a detachable input device of the type known for used with interfacing programmable logic controllers.

The present invention can advantageously be used to process tight emulsions in extra light crude oil, paraffinic tight oil emulsion and heavy crude oil feedstocks.

The operating conditions for the dynamic demulsification system are a microwave radiation frequency of about 900 MHz to about 2,500 MHz; a microwave power level of about 100 watts, in certain embodiments about 500 watts to about 5,000 watts; exposure time to microwave radiation of about 0.1 minute to about 500 minutes, in certain embodiments about 0.2 minute to about 15 minutes. The GOSP system is equipped with safety probes in order to monitor the level of microwave energy required for wet crude treatment.

On-line, real-time analysis sensors are currently used to characterize the fluids at the GOSP facility. An example of such a system is the Video Imaging Particle Analyzer (ViPA) manufactured by Jorin of the UK. The Jorin ViPA is an on-line image analysis system designed to provide information on particle and/or droplet type, size and concentration. Data can be obtained by analyzing a slip stream of the process at varying sample points. The ViPA uses a video microscope to periodically capture an image of the particles in a process flow and a processor analyses this image. Information on the shape, size, optical density and other physical characteristics are recorded for each particle in the image before the data is saved and the next image is captured. Approximately 15 images are analyzed each second. The ViPA can distinguish between solid particles and oil droplets using the difference in their shapes. The ViPA can differentiate among up to eight particle types in a single liquid flow image using any or all of the parameters.

A sensor for continuously monitoring the liquid interface utilizes a high frequency electromagnetic energy transmitter and receiver system. The sensor with the data transmitter is housed in a buoyant structure that has a density that is adjusted to position the unit to monitor the interface. A sensor suitable for use in this application is sold under the trade designation ID-223 Floating Sensor by GE Analytical Instruments of Boulder, Colo., geai@ge.com. The sensor operates on the principle that water absorbs more electromagnetic energy than hydrocarbons and changes in the absorption rate of water indicate the presence or build-up of hydrocarbons. The continuous monitoring feature of the sensor allows data to be collected dynamically in real time for transmittal to the control system. The sensors enable reliable detection of hydrocarbons and also provide valid indications of the thickness of the hydrocarbon layer and the percent of water in oily emulsions. Such sensors can also be used to detect the interface between the two emissible liquids having different absorption rates. The monitoring system employing this type of sensor can be based on wired or wireless signal transmission and can process signals from a plurality of sensors.

A suitable analog signal processor and power supply in a standard industrial enclosure is also sold by GE Analytical Instruments under the trade designation PS-220 Controller. The signal generated by the controller is proportional to hydrocarbon thickness which can be displayed as a bar graph. The signals generated by the floating sensor can be calibrated to identify tight or hard emulsions and this information can be transmitted in the feedback or feedforward circuits to control the level and duration of the microwave energy applied to the emulsion.

A sensor and monitoring system preferably includes one or more alarms which can be actuated to identify an emulsion layer thickness that exceeds a predetermined maximum operational level. The monitoring system preferably includes signal processor relays that are used for local and remote control and for actuating an alarm. Where high flow rates are involved, a so-called stilling well can be installed into which representative samples are admitted for continuous or periodic monitoring by a floating sensor that is located in the well.

Waste water from the water/oil separator can optionally be further treated to minimize the hydrocarbon content of the water discharged from the system. Various proprietary commercial processes are known in the art for this purpose. One such process is available from Prosep Inc. of Montreal, Canada (formerly known as TORR Canada Inc.) and is described as total oil remediation and recovery (TORR) process technology. It is based on multistage filtration, coalescence and gravity separation that employs a polyurethane-based adsorbent material having oleophilic and hydrophobic groups on the polymer backbone. This adsorbent material is placed in a series of vessels through which the oily water passes, and then into a recovering chamber where solution gas and free-floating and dispersed oil is finally separated from the water. The TORR process performs multi-phase separation by incorporating the physical effects of adsorption, coalescence, desorption and gravity separation in each treatment stage.

Also suitable for further treating the oily waste water before discharging it from the system is the Epcon compact flotation unit (CFU) which consists of a vertical vessel acting as a three-phase water/oil/gas separator. Centrifugal forces and gas-flotation contribute to the separation process. The oil drops and droplets are made to agglomerate and coalesce to produce larger oil drops. This eventually creates a continuous oil or emulsion layer at the upper liquid level of the flotation chamber. Internal devices in the chamber and simultaneous gas flotation effects triggered by the release of residual gas from the water facilitate the separation process. In some cases, process optimization can be achieved by introducing external gas and/or specific flocculating chemicals. The resultant oil and gas deposits are removed in a continuous process through separate outlet pipes.

Another oily waste water treatment is known as CTour Process and uses gas condensate to extract hydrocarbons from water. The condensate is injected into the produced water stream before being routed through existing hydrocyclone systems. The condensate functions as a solvent, which draws dissolved hydrocarbons out of the water phase and over into the condensate. In addition, the condensate helps to coalesce the small dispersed oil droplets, which then form larger oil droplets before being removed in the hydrocyclones. It is said that the process is also capable of removing many dissolved organic compounds from the produced water.

The process of the present invention advantageously improves the separatability of oil and water from a wet crude oil and tight emulsion by monitoring the emulsion and modifying the application of the in-line microwave treatment of the feedstock in response to information gathered from system sensors. Electromagnetic energy is applied directly to the wet crude oil to increase its temperature and thereby reduce its viscosity to facilitate the rate of coalescence and separation of the oil droplets in response to changing conditions. A further benefit is a reduction in hydrogen sulfide content with increased degassing of the soluble gas.

EXAMPLES

Example 1

A MicroSynth microwave reactor (manufactured by Milestone Srl, Sorisole (BG) Italy) was used to treat a tight emulsion of crude oil collected from an Arabian crude wellhead having a low American Petroleum Institute (API) gravity of about 11.3. The microwave reactor incorporated a safety/limiting feature to control the amount of electromagnetic energy applied to the tight emulsion crude oil. Power at a level of 500 watts (50% of the total energy capacity of the microwave reactor) was applied for 4 minutes. The API gravity was 29.1 after the treatment and electromagnetic radiation treatment by microwave reactor resulted in separation of the oil from the extra tight emulsion.

Example 2

The viscosity of a tight emulsion of crude oil from an Arabian oil field wellhead was 265.2 mm$^2$/s at 70° F. A quantity of 30 g of this tight emulsion was subjected to microwave treatment using a MicroSYNTH microwave reactor. Power at a level of 500 watts was applied for 5 minutes. No chemicals or water was added to the system.

Figure 6:
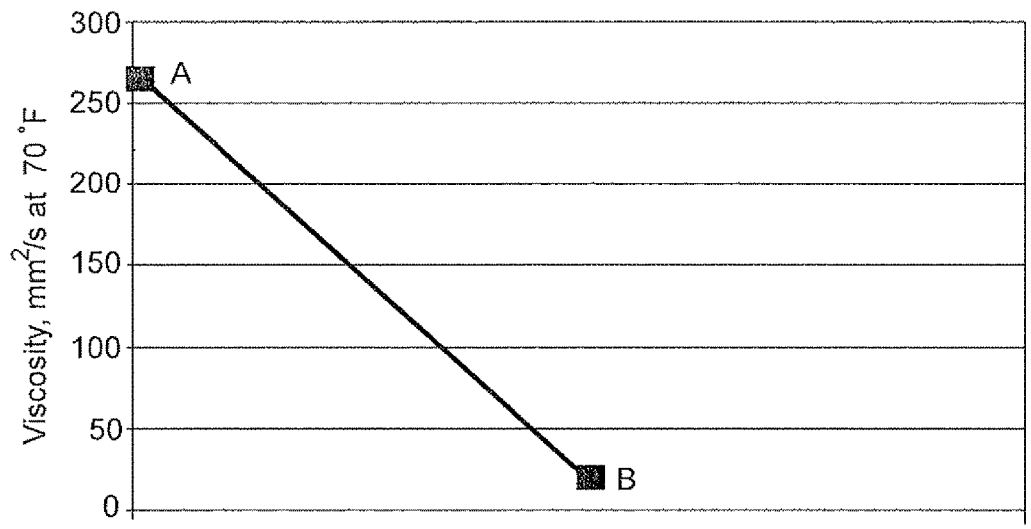
FIG. 6 is a graph showing the reduction of viscosity of tight emulsion crude oil before and after microwave treatment.

The tight emulsion was separated into an oil phase and a water phase. The viscosity of treated oil is visibly improved as the treated oil was flowable. The viscosity of treated oil was lowered to 19.4 mm$^2$/s at 70° F. Referring to the graph of FIG. 6, the viscosity results before (point A) and after (point B) of the microwave treatment are plotted. A visual inspection of the sample of the tight emulsion crude oil before and after microwave treatment established that the microwave treatment was very effective in breaking the emulsion.

Example 3

Figure 7:
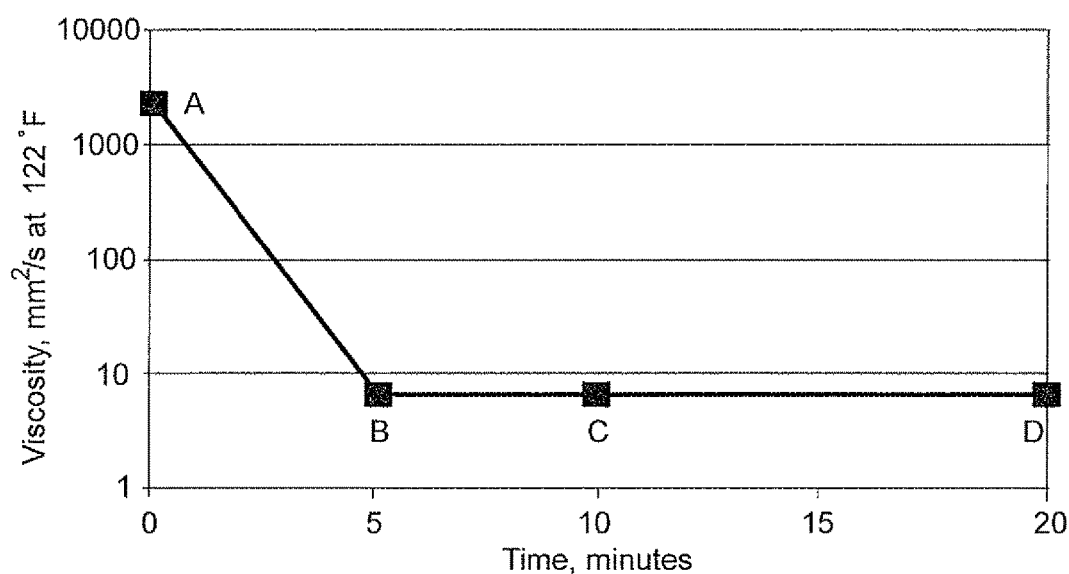
FIG. 7 is a graph showing the reduction in viscosity of a tight emulsion crude oil after different treatment time periods.

The viscosity of a tight emulsion of crude oil from a tary-oil wellhead was 2327 mm$^2$/s at 122° F. Power at a level of 1000 watts was applied to three separate samples for 5 minutes, 10 minutes and 20 minutes, respectively. The viscosity results before (point A) and after microwave treatment of each sample are shown on the graph of FIG. 7. After 5 minutes (point B), the viscosity of treated oil was reduced to 7.8 mm$^2$/s at 122° F.; after 10 minutes (point C), the viscosity of the second sample of treated oil was 8.0 mm$^2$/s at 122° F.; and after 20 minutes (point D), the viscosity of the third sample of treated oil was 7.2 mm$^2$/s at 122° F. It is noted that the viscosity was lowered significantly after 5 minutes of microwave treatment and remained almost unchanged after 10 minutes and 20 minutes of microwave treatment.

The method and system of the invention have been described above and in the attached drawings; further modifications will be apparent to those of ordinary skill in the art and the scope of protection for the invention is to be defined by the claims that follow.

What is claimed is:

1. An integrated dynamic demulsification system for use in a gas-oil separation plant (GOSP) to facilitate the removal of water from oil, the GOSP including at least a dehydrator vessel in fluid communication with a desalter vessel which in turn is in fluid communication with a water/oil separator vessel, the demulsification system comprising:
   an in-line microwave treatment subsystem upstream of the dehydrator vessel for receiving a water-in-oil emulsion;
   a sensor for the real-time monitoring and transmission of data representing one or more properties of the water-in-oil emulsion in the dehydrator vessel or downstream of the dehydrator vessel and upstream of the desalter vessel, wherein the sensor is selected from the group consisting of a buoyant structure in the dehydrator vessel that continuously monitors the liquid surface using a high-frequency electromagnetic energy transmitter and/or receiver and an imaging system that generates images of a slipstream downstream of the dehydrator vessel and upstream of the desalter vessel; and
   a processor/controller that is operably coupled to the sensor, the sensor providing data to at least one oil-separation program, wherein data from the sensor, and the at least one oil-separation program are stored in at least one memory device, the at least one oil-separation program being executable in real time by the processor/controller to:
   receive the data from the sensor and transmit one or more signals to the in-line microwave treatment subsystem to generate and apply microwave energy of predetermined characteristics to the flowing fluid based on the properties of the emulsion.

2. The system of claim 1, wherein the sensor is a buoyant structure in the dehydrator vessel that continuously monitors the liquid surface using a high-frequency electromagnetic energy transmitter and/or receiver.

3. The system of claim 1, wherein the sensor comprises an imaging system that generates images of a slipstream downstream of the dehydrator vessel and upstream of the desalter vessel.

4. An integrated dynamic demulsification system for use in a gas-oil separation plant (GOSP) to facilitate the removal of water from oil, the GOSP including at least a dehydrator vessel in fluid communication with a desalter vessel which in turn is in fluid communication with a water/oil separator vessel, the demulsification system comprising:
   an in-line microwave treatment subsystem upstream of the desalter vessel for receiving a water-in-oil emulsion;
   a sensor for the real-time monitoring and transmission of data representing one or more properties of the water-in-oil emulsion in the desalter vessel or downstream of the desalter vessel and upstream of the water/oil separator vessel, wherein the sensor is selected from the group consisting of a buoyant structure in the dehydrator vessel that continuously monitors the liquid surface using a high-frequency electromagnetic energy transmitter and/or receiver and an imaging system that generates images of a slipstream downstream of the desalter vessel and upstream of the water/oil separator vessel; and
   a processor/controller that is operably coupled to the sensor, the sensor providing data to at least one oil-separation program, wherein data from the sensor, and the at least one oil-separation program are stored in at least one memory device, the at least one oil-separation program being executable in real time by the processor/controller to:
   receive the data from the sensor and transmit one or more signals to the in-line microwave treatment subsystem to generate and apply microwave energy of predetermined characteristics to the flowing fluid based on the properties of the emulsion.

5. The system of claim 4, wherein the sensor is a buoyant structure that continuously monitors the liquid surface using a high-frequency electromagnetic energy transmitter and/or receiver.

6. The system of claim 4, wherein the sensor comprises an imaging system that generates images of a slipstream downstream of the desalter vessel and upstream of the water/oil separator vessel.

7. An integrated dynamic demulsification system for use in a gas-oil separation plant (GOSP) to facilitate the removal of water from oil, the GOSP including at least a dehydrator vessel in fluid communication with a desalter vessel which in turn is in fluid communication with a water/oil separator vessel, the demulsification system comprising:

an in-line microwave treatment subsystem upstream of the water/oil separator vessel for receiving a water-in-oil emulsion;

a sensor for the real-time monitoring and transmission of data representing one or more properties of the water-in-oil emulsion in the water/oil separator vessel or downstream of the water/oil separator vessel, wherein the sensor is selected from the group consisting of a buoyant structure in the water/oil separator vessel that continuously monitors the liquid surface using a high-frequency electromagnetic energy transmitter and/or receiver and an imaging system that generates images of a slipstream downstream of the water/oil separator vessel; and a processor/controller that is operably coupled to the sensor, the sensor providing data to at least one oil-separation program, wherein data from the sensor, and the at least one oil-separation program are stored in at least one memory device, the at least one oil-separation program being executable in real time by the processor/controller to:

receive the data from the sensor and transmit one or more signals to the in-line microwave treatment subsystem to generate and apply microwave energy of predetermined characteristics to the flowing fluid based on the properties of the emulsion.

8. The system of claim 7, wherein the sensor is a buoyant structure in the water/oil separator vessel that continuously monitors the liquid surface using a high-frequency electromagnetic energy transmitter and/or receiver.

9. The system of claim 7, wherein the sensor is an imaging system that generates images of a slipstream downstream of the water/oil separator vessel.

10. An integrated dynamic demulsification system for use in a gas-oil separation plant (GOSP) to facilitate the removal of water from oil, the GOSP including at least a dehydrator vessel in fluid communication with a desalter vessel which in turn is in fluid communication with a water/oil separator vessel, the demulsification system comprising:

a first in-line microwave treatment subsystem upstream of the dehydrator vessel for receiving a water-in-oil emulsion;

a first sensor for the real-time monitoring and transmission of data representing one or more properties of the water-in-oil emulsion in the dehydrator vessel or downstream of the dehydrator vessel and upstream of the desalter vessel, wherein the first sensor is selected from the group consisting of a buoyant structure in the dehydrator vessel that continuously monitors the liquid surface using a high-frequency electromagnetic energy transmitter and/or receiver and an imaging system that generates images of a slipstream downstream of the dehydrator vessel and upstream of the desalter vessel;

a second in-line microwave treatment subsystem upstream of the desalter vessel for receiving a water-in-oil emulsion;

a second sensor for the real-time monitoring and transmission of data representing one or more properties of the water-in-oil emulsion in the desalter vessel or downstream of the desalter vessel and upstream of the water/oil separator vessel, wherein the second sensor is selected from the group consisting of a buoyant structure in the desalter vessel that continuously monitors the liquid surface using a high-frequency electromagnetic energy transmitter and/or receiver and an imaging system that generates images of a slipstream downstream of the desalter vessel and upstream of the water/oil separator vessel; and a processor/controller that is operably coupled to at least one sensor, the at least one sensor providing data to at least one oil-separation program, wherein data from the first and second sensors, and the at least one oil-separation program are stored in at least one memory device, the at least one oil-separation program being executable in real time by the processor/controller to:

receive the data from the first sensor and transmit one or more signals to the first in-line microwave treatment subsystem to generate and apply microwave energy of predetermined characteristics to the flowing fluid based on the properties of the emulsion as determined by the first sensor, and receive the data from the second sensor and transmit one or more signals to the second in-line microwave treatment subsystem to generate and apply microwave energy of predetermined characteristics to the flowing fluid based on the properties of the emulsion as determined by the second sensor.

11. An integrated dynamic demulsification system for use in a gas-oil separation plant (GOSP) to facilitate the removal of water from oil, the GOSP including at least a dehydrator vessel in fluid communication with a desalter vessel which in turn is in fluid communication with a water/oil separator vessel, the demulsification system comprising:

a first in-line microwave treatment subsystem upstream of the dehydrator vessel for receiving a water-in-oil emulsion;

a first sensor for the real-time monitoring and transmission of data representing one or more properties of the water-in-oil emulsion in the dehydrator vessel or downstream of the dehydrator vessel and upstream of the desalter vessel, wherein the first sensor is selected from the group consisting of a buoyant structure in the dehydrator vessel that continuously monitors the liquid surface using a high-frequency electromagnetic energy transmitter and/or receiver and an imaging system that generates images of a slipstream downstream of the dehydrator vessel and upstream of the desalter vessel;

a second in-line microwave treatment subsystem upstream of the water/oil separator vessel for receiving a water-in-oil emulsion;

a second sensor for the real-time monitoring and transmission of data representing one or more properties of the water-in-oil emulsion in the water/oil separator vessel or downstream of the water/oil separator vessel, wherein the second sensor is selected from the group consisting of a buoyant structure in the water/oil separator vessel that continuously monitors the liquid surface using a high-frequency electromagnetic energy transmitter and/or receiver and an imaging system that generates images of a slipstream downstream of the water/oil separator vessel; and a processor/controller that is operably coupled to at least one sensor, the at least one sensor providing data to at least one oil-separation program, wherein data from the first and second sensors, and the at least one oil-separation program are stored in at least one memory device, the at least one oil-separation program being executable in real time by the processor/controller to:

receive the data from the first sensor and transmit one or more signals to the first in-line microwave treatment subsystem to generate and apply microwave energy of predetermined characteristics to the flowing fluid based on the properties of the emulsion as determined by the first sensor, and receive the data from the second sensor and transmit one or more signals to the second in-line microwave treatment subsystem to generate and apply microwave energy of predetermined characteristics to the flowing fluid based on the properties of the emulsion as determined by the second sensor.

12. An integrated dynamic demulsification system for use in a gas-oil separation plant (GOSP) to facilitate the removal of water from oil, the GOSP including at least a dehydrator vessel in fluid communication with a desalter vessel which in turn is in fluid communication with a water/oil separator vessel, the demulsification system comprising:

a first in-line microwave treatment subsystem upstream of the desalter vessel for receiving a water-in-oil emulsion;

a first sensor for the real-time monitoring and transmission of data representing one or more properties of the water-on-oil emulsion in the desalter vessel or downstream of the desalter vessel and upstream of water/oil separator vessel, wherein the first sensor is selected from the group consisting of a buoyant structure in the desalter vessel that continuously monitors the liquid surface using a high-frequency electromagnetic energy transmitter and/or receiver and an imaging system that generates images of a slipstream downstream of the desalter vessel and upstream of the water/oil separator vessel;

a second in-line microwave treatment subsystem upstream of the water/oil separator vessel for receiving a water-in-oil emulsion;

a second sensor for the real-time monitoring and transmission of data representing one or more properties of the water-in-oil emulsion in the water/oil separator vessel or downstream of the water/oil separator vessel, wherein the second sensor is selected from the group consisting of a buoyant structure in the water/oil separator vessel that continuously monitors the liquid surface using a high-frequency electromagnetic energy transmitter and/or receiver and an imaging system that generates images of a slipstream downstream of the water/oil separator vessel; and a processor/controller that is operably coupled to at least one sensor, the at least one sensor providing data to at least one oil-separation program, wherein data from the first and second sensors, and the at least one oil-separation program are stored in at least one memory device, the at least one oil-separation program being executable in real time by the processor/controller to:

receive the data from the first sensor and transmit one or more signals to the first in-line microwave treatment subsystem to generate and apply microwave energy of predetermined characteristics to the flowing fluid based on the properties of the emulsion as determined by the first sensor, and receive the data from the second sensor and transmit one or more signals to the second in-line microwave treatment subsystem to generate and apply microwave energy of predetermined characteristics to the flowing fluid based on the properties of the emulsion as determined by the second sensor.

* * * * *